Figure 3:
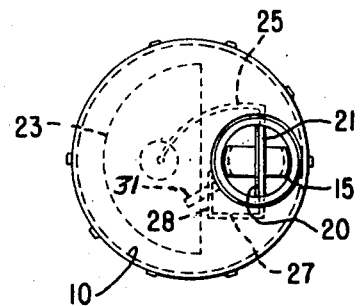

United States Patent [19]

Lacey

[11] Patent Number: 4,678,001
[45] Date of Patent: Jul. 7, 1987

[54] PUMP PRIME MAINTAINER

[76] Inventor: James J. Lacey, c/o Ed Lacey, P.O. Box 829, Trent, S. Dak. 57065

[21] Appl. No.: 828,136

[22] Filed: Feb. 10, 1986

Related U.S. Application Data

[63] Continuation-in-part of Ser. No. 711,747, Mar. 14, 1985, abandoned.

[51] Int. Cl.⁴ ............................................. F16K 31/18
[52] U.S. Cl. .................................. 137/194; 137/399; 137/429; 137/448
[58] Field of Search .......................... 417/199 A, 295; 137/192, 194, 399, 429, 447, 448

[56] References Cited

U.S. PATENT DOCUMENTS

| | | | |
|---|---|---|---|
| 1,016,573 | 2/1912 | Maddon | 137/399 |
| 1,515,904 | 11/1924 | Sievers | 137/447 X |
| 1,987,070 | 1/1935 | La Bour | 137/199 |
| 2,013,999 | 9/1935 | Hutt | 137/399 |
| 2,383,507 | 8/1945 | Martin | 137/429 X |
| 2,855,944 | 10/1958 | Albin | 137/429 X |
| 2,934,082 | 4/1960 | Gilliard | 137/447 X |
| 4,219,312 | 8/1980 | Mori | 417/295 |

FOREIGN PATENT DOCUMENTS 197807  7/1978  Fed. Rep. of Germany ... 417/211.5

Primary Examiner—Alan Cohan

[57] ABSTRACT

A device for controlling the flow through a suction pump to prevent loss of prime usable especially in narrow ditches and similar smaller areas, and consisting principally of a float controlled valve adapted to regulate the flow of fluid into the pump. The entire device is enclosed is a cylindrical casing adapted to be placed in a relatively small hole.

4 Claims, 4 Drawing Figures

U.S. Patent     Jul. 7, 1987     4,678,001

PUMP PRIME MAINTAINER

BACKGROUND AND SUMMARY OF THE INVENTION

This application is a continuation in part of a former application filed by me as Ser. No. 06/711,747, filed Mar. 14, 1985, and now abandoned.

This invention pertains to float controlled valves and more particularly to such a valve adapted to be used in a ditch or a "de-watering" well in a sewer or similar narrow area and in connection with a pump used to keep water from the ditch while working in the area.

Many times in the laying of sewer lines or repairing of such lines or in manholes used in such lines, a major problem may well be seepage water or occasionally surface water flowing into such areas. This problem also exists in other similar work at levels beneath the surface of adjacent ground.

Suction pumps having pipes of a diameter substantially less than the width of the ditch are commonly used to control such water. However, many pumps rapidly lose their prime if they are allowed to suck air as the water is exhausted. This problem becomes truly troublesome when the water rises in the ditch or manhole while the pump is being reprimed. Workmen are interrupted. Occasionally, even work or the sealing in pipe joints may be impaired, and other problems arise.

The easy solution to such problems is to keep the pump operating in the water so that it does not lose its prime. This solution is achieved by my invention. I simply provide a float valve adapted to adjust the flow of water so that the flow never quite stops. The valve is constructed so that it fits within a cylindrical container only somewhat larger than the pipe by which the water is exhausted. The means by which I accomplish this is described hereinafter and with reference to the following figures.

FIGURES

Figures 1, 2:
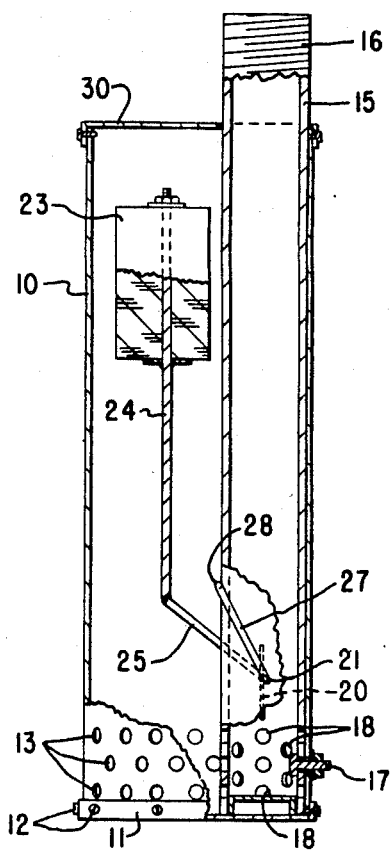
Figure 4:
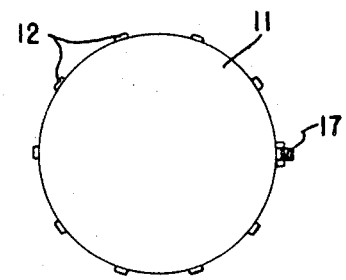

FIG. 1 is a longitudinal, medial sectional view of my valve, in a wide open position, FIG. 2 is a partial view similar to FIG. 1 with the valve closed, FIG. 3 is a top view of the device of FIG. 1, and FIG. 4 is a bottom view of the device.

DESCRIPTION

Briefly my invention comprises a float controlled valve contained in a cylindrical casing which is adapted to be placed in the line to a pump and to be set in a cylindrical sump or de-watering well or simply in a ditch for the purpose of keeping excess water from the ditch. The valve is never completely closed and is adjusted by the float level to control the flow of water, but never to shut it completely off.

More specifically and referring to the figures, I provide a casing 10 for housing the valve mechanism. This housing is preferably substantially tubal in shape as shown and is provided with an enclosed bottom 11 which may be held in place by screws 12. The casing 10 is perforated with a series of holes 13 so that water (or other fluid) may flow freely into the interior chamber of the casing. It will be apparent that these holes could also be punched in the bottom 11, so long as the water is free to flow into the casing.

A pipe 15 having a threaded end 16 adapted to connect to the suction hose of a pump (not shown) is disposed within the casing, and is held in place by a bolt 17 running through the casing 10. A plug 18 may be fixed to the bottom 11, or formed as a part of that member. This plug is of such size that it will fit within the pipe 15 and will therefore stabilize the position of the pipe. The pipe 15 is also perforated by a series of holes 18 for the purpose of allowing water to flow into the pipe and to be pumped from there by the pump and thereby being removed from the ditch.

In order to preserve the compact size of the device I prefer to use a casing 10 having a diameter of the order of 2 to 3 times but not more than 4 times the diameter of the pipe 15. That relative size makes the use of the device quite feasible in a relatively narrow ditch or small man hole.

A valve device is disposed within the pipe 15. My preferred embodiment, as illustrated, uses a butterfly valve having a loosely fitting plate 20 attached to an axle 21 pivotally mounted in the pipe 15. The plate is adapted to turn from the closed position shown in FIG. 2 in which the plate closes off most of the pipe to the open position shown in FIG. 1 in which the plate 20 lies parallel to the axis of the pipe and therefore allows maximum fluid flow.

The plate 20, when in the closed position, does not fit tight in the pipe 15. Instead, there is a gap all around so that some liquid can always flow past the plate. This construction is important because most pumps used for this type of operation must pump continuously or else will require priming in order to start pumping again. Therefore, there must be substantial leakage past the valve in order for the device to operate best. It will readily be apparent that a by-pass device could be used around a tighter fitting valve. However, the structure then becomes more complex and therefore I prefer the loosely fitting plate 20.

The position of the plate 20 in the pipe 15 is controlled by a float mechanism. This mechanism includes a float 23 which may be of semi-cylindrical shape to conform to the inside shape of the casing 10. Thus, the float is adapted to slide vertically within the casing. Shaping the float 23 to conform to the casing 10 also makes possible the desired compactness of the device.

A float rod 24 is pivotally connected to a link 25 attached to or formed integrally with the axle 21. In the device illustrated, the float rod 24 is rigidly connected to the float 23. As the float rises and falls, the motion of the link 25 causes the float to tilt somewhat because the end of the link travels through an arc. Because the float is relatively loosely disposed in the casing, this tilting does not cause any problem. However, I realize that if the float did fit somewhat more tightly, provision would necessarily be made to avoid tilting. This could readily be done by pivotally connecting the rod 24 to the float 23.

Stop means for the valve mechanism may be provided. In the embodiment shown, this comprises an arm 27 extending from the axle 20 at the end opposite the link 25. This arm 27 like that link 25 may be formed integrally with the axle. However, for purposes of assembly and adjustment, it my be desirable to attach the arm removeably to the axle by any reasonable means well known in the art. The arm 27 extends beyond the pipe 15 and terminates in a finger 28 (FIG. 3) adapted to engage the pipe 15 when the valve is open as shown in FIG. 1. This prevents the float 23 from pulling the valve plate 20 beyond the full-open position when water in the casing rises above the level at which the float 23 is in position to fully open the valve. An alternative method of stopping this motion would be to proportion the casing 10 and the rod 24 so that the top of the float 23 would engage the cover 30 of the casing at the fully open position of the valve means. A closing stop means is provided also in connection with the arm 27. This means comprises a tab 31 attached to the pipe 15 and extending to a point where the finger 28 will contact it when the valve is fully closed. Other means may also occur to those skilled in the art. Thus, the open and closed positions of the valve are fully limited.

The operation of the device should be fairly evident. The device is placed in the ditch or in a sump or dewatering well and the pipe 15 is connected to a pump. As the water rises in the casing 10, the float 23 rises and opens the valve mechanism. When the pump is started, it is allowed to run continuously, and with the wide open valve, draws out considerable liquid. When the water level recedes to the level at which the float begins to close the valve, the pump will pump less water, but will still pump some. If the inflow into the ditch or sump then balances the amount pumped, that balance my be maintained. Or if the pumping capacity still exceeds the inflow, the float will still drop and the valve close even more until eventually the valve will reach the fully-closed position. Even at that point there will still be flow so that the pump will never suck only air and loose its prime. It should be noted that the float level at the fully closed position is still considerably above the level of the valve. Thus, there is always some reservoir of water in the sump or dewatering well in which the device is placed. It will only be in cases of extremely slow inflow of water that the pump will exhaust all the liquid through the closed "leaky" valve and thus get to the point of sucking air.

What is claimed:

1. A device to control the flow of liquid being exhausted from a sump or the like comprising a substantially circular cylindrical casing formed to provide openings through which said liquid can enter said casing, a pipe extending into said casing, a butterfly valve in said pipe, said valve having a pivoting plate loosely fitting in said pipe, said valve having an open position and a closed position and being movably adjustable between the two positions, float means operably connected to said valve and adapted to move said valve between said open and closed positions, said float means including a float vertically slidable within said casing.

2. The device of claim 1 in which said float is connected to said plate by a linkage.

3. The device of claim 1 in which movement of said float in an upward direction is limited by stop means, said stop means being effective when said valve is in its open position.

4. The device of claim 3 in which said float is connected to said plate by linkage means, stop means connected to said linkage means and engagable with said pipe to stop the movement of said float when said plate is in its open position.

* * * * *